United States Patent
Kim

(10) Patent No.: US 11,472,481 B2
(45) Date of Patent: Oct. 18, 2022

(54) APPARATUS AND METHOD FOR CONTROLLING VEHICLE BY DETERMINING DISTORTION IN LANE RECOGNITION

(71) Applicant: MANDO CORPORATION, Pyeongtaek-si (KR)

(72) Inventor: TaeHan Kim, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 446 days.

(21) Appl. No.: 16/595,732

(22) Filed: Oct. 8, 2019

(65) Prior Publication Data

US 2020/0108868 A1    Apr. 9, 2020

(30) Foreign Application Priority Data

Oct. 8, 2018  (KR) .......................... 10-2018-0120086

(51) Int. Cl.
| | | |
|---|---|---|
| *B62D 15/00* | (2006.01) | |
| *B62D 15/02* | (2006.01) | |
| *G06V 20/56* | (2022.01) | |
| *B60R 11/00* | (2006.01) | |
| *B60R 11/04* | (2006.01) | |

(52) U.S. Cl.
CPC ......... *B62D 15/025* (2013.01); *G06V 20/588* (2022.01); *B60R 11/04* (2013.01); *B60R 2011/004* (2013.01); *B60R 2300/804* (2013.01)

(58) Field of Classification Search
USPC .............................................. 701/36, 41–44
See application file for complete search history.

(56) References Cited

U.S. PATENT DOCUMENTS

| | | | | |
|---|---|---|---|---|
| 5,765,116 | A * | 6/1998 | Wilson-Jones | ...... G05D 1/0246 340/439 |
| 5,957,983 | A * | 9/1999 | Tominaga | ................ B62D 1/28 701/41 |
| 6,473,678 | B1 * | 10/2002 | Satoh | ....................... B62D 1/28 340/439 |
| 6,580,986 | B1 * | 6/2003 | Uenuma | .............. G05D 1/0246 701/28 |
| 9,224,053 | B1 * | 12/2015 | Ferguson | .............. B60W 30/12 |
| 2005/0270374 | A1 * | 12/2005 | Nishida | ................ G05D 1/0246 348/148 |
| 2010/0114431 | A1 * | 5/2010 | Switkes | ................. B62D 6/006 701/41 |

(Continued)

FOREIGN PATENT DOCUMENTS

| | | |
|---|---|---|
| JP | 5513327 B2 | 6/2014 |
| JP | 6189815 B2 | 8/2017 |

(Continued)

OTHER PUBLICATIONS

Office Action issued in corresponding Korean Patent Application No. 10-2018-0120086, dated Sep. 5, 2019.

*Primary Examiner* — Jonathan L Sample
(74) *Attorney, Agent, or Firm* — Morgan, Lewis & Bockius LLP

(57) ABSTRACT

Disclosed are an apparatus and a method for controlling a vehicle by determining a distortion in lane recognition, which calculate an error variance of the recognized lane, determine a distortion degree of the recognized lane using the error variance, and control the steering of the vehicle using the determined distortion degree.

18 Claims, 12 Drawing Sheets

(56) References Cited

U.S. PATENT DOCUMENTS

| | | | | |
|---|---|---|---|---|
| 2014/0152432 A1* | 6/2014 | Zobel | ................ | G08G 1/167 |
| | | | | 340/435 |
| 2014/0218508 A1* | 8/2014 | Kim | ................ | G06V 20/588 |
| | | | | 348/118 |
| 2016/0185388 A1* | 6/2016 | Sim | ................ | G06V 20/588 |
| | | | | 701/41 |
| 2017/0057502 A1* | 3/2017 | Pandita | ................ | G05D 1/0246 |
| 2017/0267177 A1* | 9/2017 | Nariyambut Murali ................ | | |
| | | | | G08G 1/167 |
| 2018/0328741 A1* | 11/2018 | Pratt | ................ | E01F 9/30 |
| 2018/0365858 A1* | 12/2018 | Kim | ................ | G06T 7/13 |
| 2019/0088137 A1* | 3/2019 | Yamada | ................ | G06V 20/58 |
| 2019/0147253 A1* | 5/2019 | Bai | ................ | G06V 10/454 |
| | | | | 382/103 |
| 2019/0147254 A1* | 5/2019 | Bai | ................ | G06V 10/82 |
| | | | | 382/104 |

FOREIGN PATENT DOCUMENTS

| | | |
|---|---|---|
| JP | 2018-103863 A | 7/2018 |
| JP | 2018-155732 A | 10/2018 |
| KR | 10-2014-0021826 A | 2/2014 |
| KR | 10-2017-0059134 A | 5/2017 |

* cited by examiner

APPARATUS AND METHOD FOR CONTROLLING VEHICLE BY DETERMINING DISTORTION IN LANE RECOGNITION

CROSS-REFERENCE TO RELATED APPLICATION(S)

This application is based on and claims priority under 35 U.S.C. § 119 to Korean Patent Application No. 10-2018-0120086, filed on Oct. 8, 2018, in the Korean Intellectual Property Office, the present disclosure of which is incorporated by reference herein in its entirety.

BACKGROUND

1. Technical Field

The present disclosure relates to an apparatus and a method for controlling a vehicle by determining a distortion in lane recognition.

2. Description of the Related Art

The level 2 autonomous driving system (Highway Driving Assist, Lane Following Assist) currently being mass produced performs steering control based on the recognized lane information. Lane information may be distorted at intersections, hill climbs, and the like, and this distortion causes a steering miscontrol, which may cause driver anxiety as well as accidents.

Therefore, when it is possible to determine whether a distortion occurs in lane recognition, a steering control amount may be adaptively adjusted according to lane information, thereby mass producing a more stable system.

SUMMARY

It is an aspect of the present disclosure to provide an apparatus and a method for adaptively adjusting a steering control amount according to lane information by determining whether a distortion occurs in lane recognition.

Additional aspects of the present disclosure will be set forth in part in the description which follows and, in part, will be obvious from the description, or may be learned by practice of the present disclosure.

In accordance with an aspect of the present disclosure, an apparatus, which is for controlling a vehicle by determining a distortion in lane recognition, includes a lane recognizer including an image sensor disposed in the vehicle to have a view of the outside of the vehicle and configured to capture image data and a processor configured to process the image data captured by the image sensor, and recognizing a front driving lane of the driving vehicle, and a controller configured to control the vehicle by determining a distortion in lane recognition based at least in part on the processing of the image data, wherein the controller includes an error variance calculator for calculating an error variance of the recognized lane, a distortion degree determiner for determining a distortion degree of the recognized lane using the error variance, and a vehicle controller for controlling the steering of the vehicle using the determined distortion degree.

In accordance with another aspect of the present disclosure, an apparatus, which is for controlling a vehicle by determining a distortion in lane recognition, includes a lane recognizer including an image sensor disposed in the vehicle to have a view of the outside of the vehicle and configured to capture image data, and a domain control unit configured to recognize a front driving lane of the vehicle by processing image data captured by the image sensor and to control at least one driver assistance system provided in the vehicle, wherein the domain control unit, based at least in part on the processing of the image data, calculates an error variance of the recognized lane, determines a distortion degree of the recognized lane using the error variance, and controls the steering of the vehicle using the determined distortion degree.

In accordance with another aspect of the present disclosure, an image sensor is disposed in a vehicle to have a view of the outside of the vehicle and configured to capture image data, wherein, the image data is, by being processed by a processor, used to recognize a front driving lane of the vehicle, calculate an error variance of the recognized lane, and determine a distortion degree of the recognized lane using the error variance, and the determined distortion degree is used to control the steering of the vehicle.

In accordance with another aspect of the present disclosure, a method, which is for controlling a vehicle by determining a distortion in lane recognition, includes recognizing a front driving lane of the vehicle, calculating an error variance of the recognized lane, determining a distortion degree of the recognized lane using the error variance, and controlling the steering of the vehicle using the determined distortion degree.

In accordance with another aspect of the present disclosure, an apparatus, which is for controlling a vehicle by determining a distortion in lane recognition, includes a lane recognizer including an image sensor disposed in the vehicle to have a view of the outside of the vehicle and configured to capture image data and a processor configured to process the image data captured by the image sensor, and recognizing a front driving lane of the driving vehicle, and a controller configured to control the vehicle by determining a distortion in lane recognition based at least in part on the processing of the image data, wherein the controller includes a lane misrecognition determiner for importing view range information from the recognized lane information and determining whether the lane is misrecognized using the view range information, an error variance calculator for calculating an error variance from the recognized lane information, a distortion degree determiner for determining a distortion degree of the lane using the error variance, and a vehicle controller for controlling the steering of the vehicle using whether the determined lane is misrecognized and the determined distortion degree.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
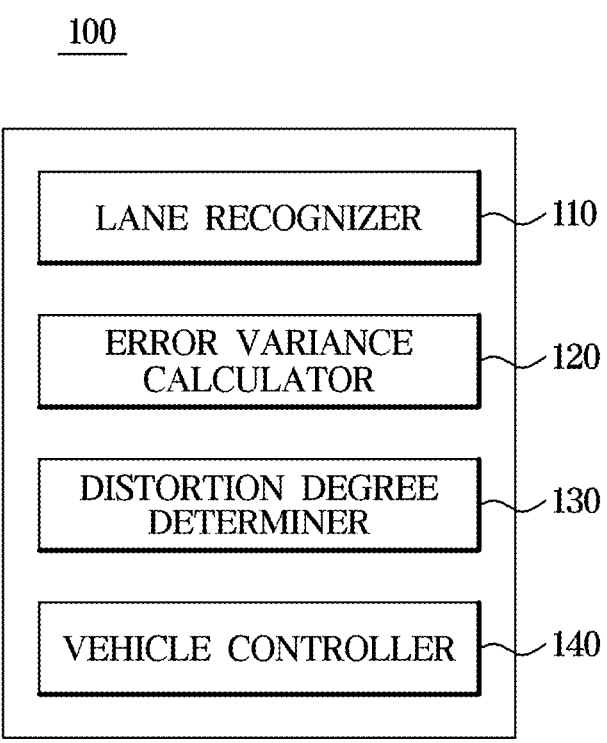
FIG. 1 is a block diagram of an apparatus for controlling a vehicle by determining a distortion in lane recognition according to an embodiment of the present disclosure.

Hereinafter, embodiments of the present disclosure will be described in detail with reference to the accompanying drawings. Like reference numerals refer to like elements throughout this specification. This specification does not describe all components of the embodiments, and general contents in the technical field to which the present disclosure belongs or overlapping contents between the embodiments will not be described.

It will be understood that, although the terms first, second, A, B, (a), (b) etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. Throughout this specification, when a portion is connected to another portion, this includes the case in which the portion is indirectly connected to the other portion, as well as the case in which the portion is directly connected to the other portion, and the indirect connection includes a connection through a wireless communication network.

FIG. 1 is a block diagram of an apparatus for controlling a vehicle by determining a distortion in lane recognition according to an embodiment of the present disclosure.

Referring to FIG. 1, an apparatus 100 for controlling a vehicle by determining a distortion in lane recognition includes a lane recognizer 110, an error variance calculator 120, a distortion degree determiner 130, and a vehicle controller 140. FIG. 1 illustrates that the apparatus 100 for controlling a vehicle includes only components related to the present embodiment. Accordingly, it will be understood by those skilled in the art that other general purpose components may be further included in addition to the components shown in FIG. 1.

According to an example, the lane recognizer 110 may recognize a front driving lane of the driving vehicle. For example, the lane recognizer 110 may recognize an intersection zigzag lane, a lane by an intersection crosswalk, a lane by an intersection lane guidance line, or a toll gate lane.

The lane recognizer 110 may include an image sensor disposed in the vehicle to have a view of the outside of the vehicle and configured to capture image data, and a processor configured to process the image data captured by the image sensor. The image sensor may be mounted to each part of the vehicle to have a view of the front, side or rear of the vehicle. According to an example, the image sensor and the processor may be implemented as one camera sensor.

Because image information photographed by the image sensor is composed of image data, the image information may mean image data captured by the image sensor. Hereinafter in the present disclosure, image information photographed by the image sensor means image data captured by the image sensor. The image data captured by the image sensor may be generated, for example, in one of raw formats of AVI, MPEG-4, H.264, DivX, and JPEG. The image data captured in the image sensor may be processed in the processor.

In addition, the image sensor may be configured to capture image data by being disposed in the vehicle to have a view of the outside of the vehicle. The image data captured by the image sensor is processed by the processor and may be used to recognize the front driving lane of the vehicle, calculate an error variance of the recognized lane and determine a distortion degree of the recognized lane using the error variance, and the determined distortion degree may be used to control the steering of the vehicle.

The processor may operate to process image data captured by the image sensor. For example, at least some of operations for recognizing the front driving lane of the vehicle from the image data, calculating an error variance of the recognized lane and determining a distortion degree of the recognized lane using the error variance may be executed by the processor.

The processor may be implemented using at least one of electrical units capable of processing the image data and performing other functions, such as, for example, ASICs (application specific integrated circuits), DSPs (digital signal processors), DSPDs (digital signal processing devices), PLDs (programmable logic devices), FPGAs (field programmable gate arrays), processors, controllers, micro controllers, and microprocessors.

The controller may control the overall operation of the apparatus 100 for controlling the vehicle by determining a distortion in lane recognition. According to an example, the controller may be implemented as an electronic control unit (ECU). The controller may receive a processing result of the image data from the processor. The controller may be configured to control the vehicle by determining a distortion in lane recognition based at least in part on the processing of the image data. According to an example, the controller may include the error variance calculator 120, the distortion degree determiner 130, and the vehicle controller 140.

The error variance calculator 120 may calculate an error variance of the recognized lane. For example, the error variance calculator 120 may calculate an error variance of the recognized intersection zigzag lane. In addition, the error variance calculator 120 may calculate error variances of a lane by the recognized intersection crosswalk, a lane by the recognized intersection lane guidance line, or the recognized toll gate lane, respectively.

The distortion degree determiner 130 may determine a distortion degree of the recognized lane using the error variance. When the error variance is greater than a preset threshold, the distortion degree determiner 130 may determine that the recognized lane has a low reliability and is distorted. In addition, when the error variance is less than or equal to the preset threshold, the distortion degree determiner 130 may determine that the recognized lane has a high reliability and is not distorted.

The vehicle controller 140 may control the steering of the vehicle using the determined distortion degree. For example, when the distortion degree determiner 130 determines that the recognized lane has a low reliability and is distorted, the vehicle controller 140 may control the steering of the vehicle to follow a preceding vehicle. Or when the distortion degree determiner 130 determines that the recognized lane has a low reliability and is distorted, the vehicle controller 140 may transfer the steering control right of the vehicle to a driver so that the driver directly controls the steering of the vehicle. In contrast, when the distortion degree determiner 130 determines that the recognized lane has a high reliability and is not distorted, the vehicle controller 140 may control the steering of the vehicle along the recognized lane.

Figure 2:
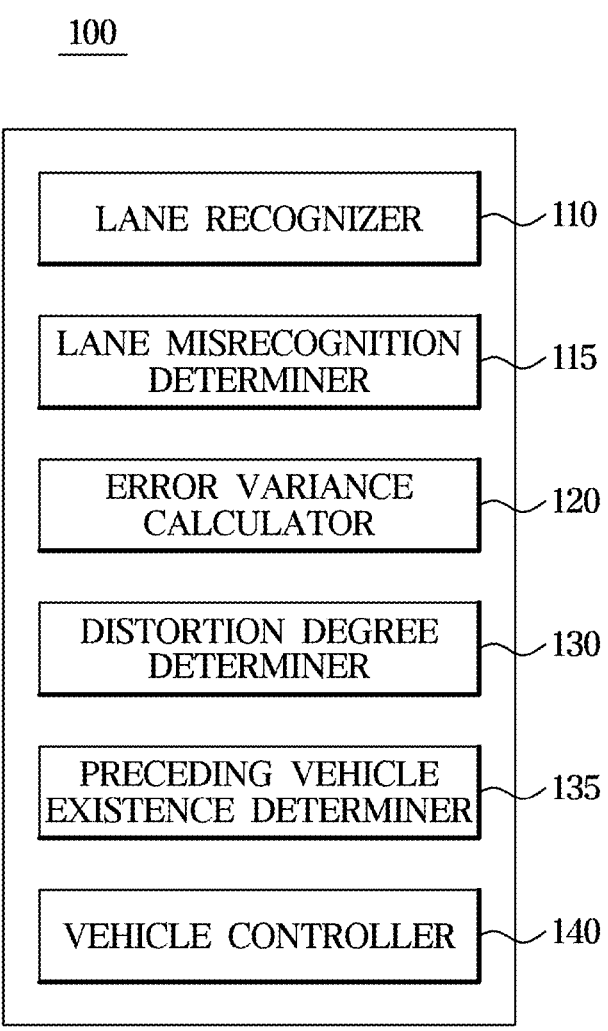
FIG. 2 is a block diagram of the apparatus for controlling the vehicle by determining a distortion in lane recognition according to an embodiment of the present disclosure.

FIG. 2 is a block diagram of the apparatus for controlling the vehicle by determining a distortion in lane recognition according to an embodiment of the present disclosure.

Referring to FIG. 2, the apparatus 100 for controlling the vehicle by determining a distortion in lane recognition includes an image sensor disposed in the vehicle to have a view of the outside of the vehicle and configured to capture image data, and a processor configured to process the image data captured by the image sensor, and further includes the lane recognizer 110 for recognizing a front driving lane of the driving vehicle and a controller configured to control the vehicle by determining a distortion in lane recognition based at least in part on the processing of the image data. The controller includes a lane misrecognition determiner 115 for importing view range information from the recognized lane information and determining whether the lane is misrecognized using the view range information, the error variance calculator 120 for calculating an error variance from the recognized lane information, the distortion degree determiner 130 for determining a distortion degree of a lane using the error variance, a preceding vehicle existence determiner 135 determining whether a preceding vehicle exists in the front of the vehicle, and the vehicle controller 140 for controlling the steering of the vehicle using whether the determined lane is misrecognized and the distortion degree.

The lane recognizer 110, the error variance calculator 120, the distortion degree determiner 130 and the vehicle controller 140 illustrated in FIG. 2 may be explained corresponding to the lane recognizer 110, the error variance calculator 120, the distortion degree determiner 130 and the vehicle controller 140 illustrated in FIG. 1.

As an example, when the lane recognizer 110 recognizes a front driving lane of the driving vehicle, the lane misrecognition determiner 115 may import view range information from the recognized lane information and determine whether the lane is misrecognized using the view range information. For example, the lane misrecognition determiner 115 may determine that the lane is misrecognized when the view range is less than a preset value.

As an example, when the distortion degree determiner 130 determines that the recognized lane has a low reliability and is distorted, the preceding vehicle existence determiner 135 may determine the existence of the preceding vehicle. When the preceding vehicle existence determiner 135 determines that the preceding vehicle exists, the vehicle controller 140 may perform lateral vehicle control using the driving trajectory of the preceding vehicle. When the preceding vehicle existence determiner 135 determines that the preceding vehicle does not exist, the vehicle controller 140 may transfer the steering control right of the vehicle to the driver so that the driver directly controls the steering of the vehicle. In addition, even while the vehicle controller 140 performs the lateral vehicle control using the driving trajectory of the preceding vehicle, the preceding vehicle existence determiner 135 may continuously determine whether the preceding vehicle exists. When the preceding vehicle existence determiner 135 determines that the preceding vehicle does not exist, the vehicle controller 140 may transfer the steering control right of the lateral vehicle to the driver so that the driver directly controls the steering of the vehicle.

The apparatus 100 for controlling the vehicle by determining a distortion in lane recognition may include a lane recognizer including an image sensor configured to capture image data by being disposed in the vehicle to have a view of the outside of the vehicle, and a domain control unit (DCU) configured to control at least one driver assistance system provided in the vehicle and process the image data captured by the image sensor to recognize a front driving lane of the vehicle.

According to an example, the processor for processing the image data, the controller, which have been described above, and a controller of various devices included in the vehicle may be integrated into one and implemented as the domain control unit. In this case, the domain control unit may generate various vehicle control signals to control the driver assistance system provided in the vehicle and various devices of the vehicle related thereto.

The domain control unit may, based at least in part on the processing of the image data, calculate an error variance of the recognized lane, determine a distortion degree of the recognized lane using the error variance, and control the steering of the vehicle using the determined distortion degree. For such processing, the domain control unit may include at least one processor.

The domain control unit is provided in the vehicle and may communicate with at least one image sensor and at least one non-image sensor mounted in the vehicle. To this end, a suitable data link or communication link may be further included, such as a vehicle network bus for data transmission or signal communication.

The domain control unit may operate to control one or more of the various driver assistance systems (DAS) used in the vehicle. The domain control unit may, based on the sensing data captured by the plurality of non-image sensors and the image data captured by the image sensor, control a driver assistance system (DAS) such as a blind spot detection (BSD) system, an adaptive cruise control (ACC) system, a lane departure warning system (LDWS), a lane keeping assistance system (LKAS), and a lane change assistance system (LCAS).

The domain control unit may calculate an error variance of the recognized lane. For example, the domain control unit may calculate an error variance of the recognized intersection zigzag lane. In addition, the domain control unit may calculate error variances of a lane by the recognized intersection crosswalk, a lane by the recognized intersection lane guidance line, or the recognized toll gate lane, respectively.

The domain control unit may determine a distortion degree of the recognized lane using the error variance. When the error variance is greater than the preset threshold, the domain control unit may determine that the recognized lane has a low reliability and is distorted. In addition, when the error variance is less than or equal to the preset threshold, the domain control unit may determine that the recognized lane has a high reliability and is not distorted.

The domain control unit may control the steering of the vehicle using the determined distortion degree. For example, when it is determined that the recognized lane has a low reliability and is distorted, the domain control unit may control the steering of the vehicle to follow a preceding vehicle. Or when it is determined that the recognized lane has a low reliability and is distorted, the domain control unit may transfer the steering control right of the vehicle to the driver so that the driver directly controls the steering of the vehicle. In contrast, when it is determined that the recognized lane has a high reliability and is not distorted, the domain control unit may control the steering of the vehicle along the recognized lane.

As an example, when a front driving lane of the driving vehicle is recognized, the domain control unit may import view range information from the recognized lane information and determine whether the lane is misrecognized using the view range information. For example, the domain control unit may determine that the lane is misrecognized when the view range is less than the preset value.

As an example, when it is determined that the recognized lane has a low reliability and is distorted, the domain control unit may determine the existence of the preceding vehicle. When it is determined that the preceding vehicle exists, the domain control unit may perform lateral vehicle control using the driving trajectory of the preceding vehicle. When it is determined that the preceding vehicle does not exist, the domain control unit may transfer the steering control right of the vehicle to the driver so that the driver directly controls the steering of the vehicle. In addition, even while the domain control unit performs the lateral vehicle control using the driving trajectory of the preceding vehicle, the domain control unit may continuously determine whether the preceding vehicle exists. When it is determined that the preceding vehicle does not exist, the domain control unit may transfer the steering control right of the lateral vehicle to the driver so that the driver directly controls the steering of the vehicle.

Hereinafter, an operation of the apparatus 100 for controlling the vehicle by determining a distortion in lane recognition will be described in detail with reference to the related drawings. Hereinafter, although it will be described with reference to the lane misrecognition determiner 115, the error variance calculator 120, the distortion degree determiner 130, the preceding vehicle existence determiner 135 and the vehicle controller 140, which are included in the controller, the present disclosure is not limited thereto. The following description of the operations of the lane misrecognition determiner 115, the error variance calculator 120, the distortion degree determiner 130, the preceding vehicle existence determiner 135 and the vehicle controller 140 may be substantially the same as the description of the domain control unit except for the content that is not applicable.

Figure 3:
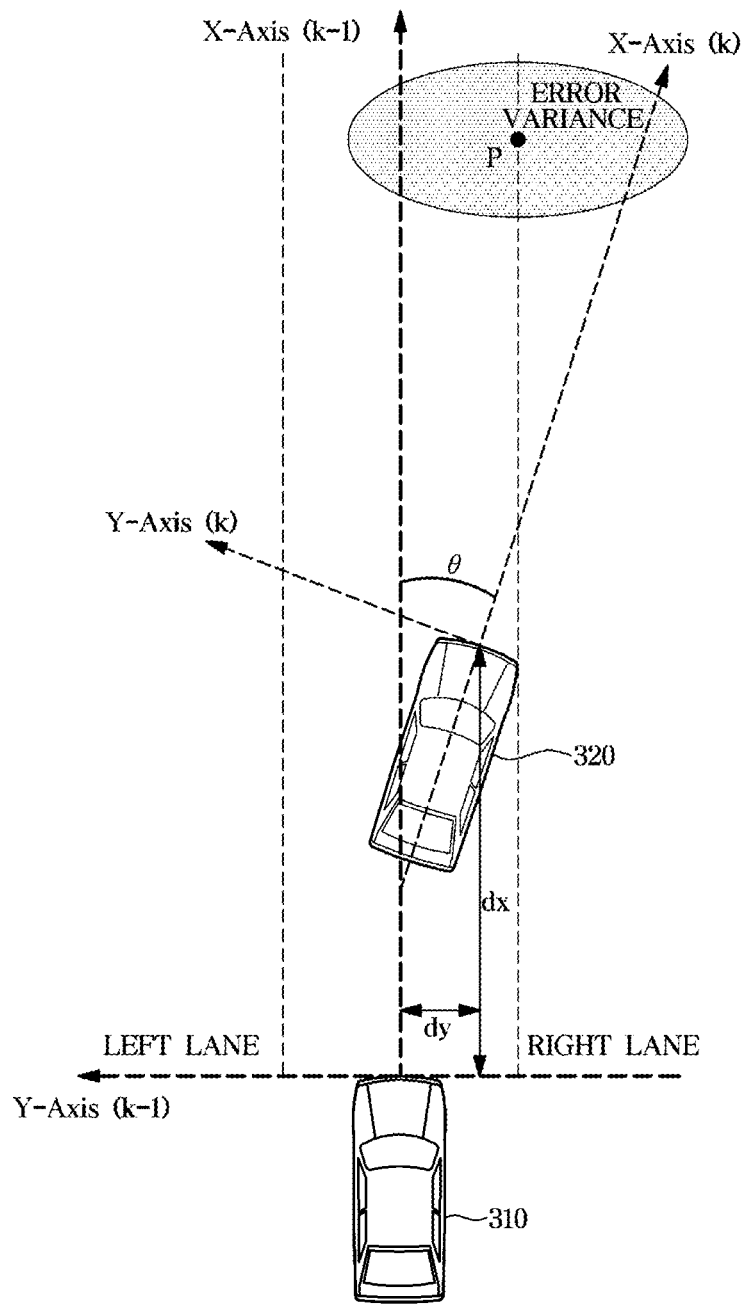
FIG. 3 is a view illustrating a method of calculating an error variance for determining a distortion in lane recognition.

FIG. 3 is a view illustrating a method 300 of calculating an error variance for determining a distortion in lane recognition.

Referring to FIG. 3, $P_{k,x}$ may indicate the position of a vehicle 320 at a point of time k on an axis (x axis) parallel to a driving lane. $P_{k,y}$ may indicate the position of the vehicle on a vertical axis (y axis) to the left or right side of the lane at the point of time k with respect to the driving lane. $P_{k,y}$ may be represented using a predetermined lane model such as Equation 1.

$$P_{k,y} = \text{LaneModel}(P_{k,x}, C_{k,0}, C_{k,1}, C_{k,2}, C_{k,3}) \quad \text{[Equation 1]}$$

According to an example, as the coefficients applied to the lane model, a lane offset value at the point of time k may be applied to $C_{k,0}$, a lane heading angle may be applied to $C_{k,1}$, a lane curvature may be applied to $C_{k,2}$, and a derivative value of the lane curvature may be applied to $C_{k,3}$. However, this is only an example, and the present disclosure is not limited thereto. That is, the present disclosure is not limited to a specific lane model as long as an error variance for calculating a distortion in lane recognition may be calculated.

$P_{k-1}$ indicates the position of the vehicle 310 at a point of time k−1 (a point of time before the inter-vehicle distance (e.g., 1 second) from the point of time k), and an equation for calculating the y-axis coordinate of $P_{k-1}$ may be expressed as in Equation 2.

$$P_{k-1} = R^{-1} P_k + d_{k,k-1}, \; R = \begin{bmatrix} \cos(\theta) & -\sin(\theta) \\ \sin(\theta) & \cos(\theta) \end{bmatrix}, \; d_{k,k-1} = \begin{bmatrix} dx \\ dy \end{bmatrix} \quad \text{[Equation 2]}$$

An error variance may be calculated using $P'_{k-1,y}$ calculated by substituting $P_{k-1,x}$ into the lane model. $P'_{k-1,y}$ may be expressed as Equation 3 below.

$$P'_{k-1,y} = \text{LaneModel}(P_{k-1,x}, C_{k-1,0}, C_{k-1,1}, C_{k-1,2}, C_{k-1,3}) \quad \text{[Equation 3]}$$

In this case, an error variance $E_{N,y}$ for a position error with respect to the y-axis of the lane calculated from the point of time k−1 to a point of time k−N may be calculated using Equation 4 below.

$$E_{N,y} = \text{Var}(|P'_{k-i,y} - P_{k-i,y}|), \; i=1{:}N \quad \text{[Equation 4]}$$

Figure 4:
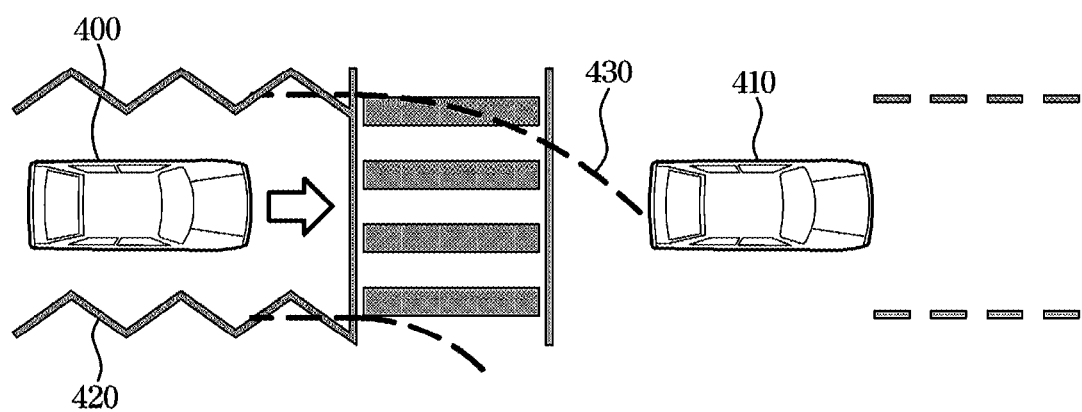
FIG. 4 is a view for explaining a control of a misrecognition due to an intersection zigzag lane according to an embodiment of the present disclosure.

FIG. 4 is a view for explaining a control of a misrecognition due to an intersection zigzag lane according to an embodiment of the present disclosure.

Referring to FIG. 4, in a case where there is a lane 430 that is misrecognized due to an intersection zigzag lane 420 when a driving vehicle 400 passes through the intersection zigzag lane 420, the apparatus 100 for controlling the vehicle by determining a distortion in lane recognition may perform the lateral vehicle control so that the driving vehicle 400 travels using the driving trajectory of a preceding vehicle 410.

Figure 5:
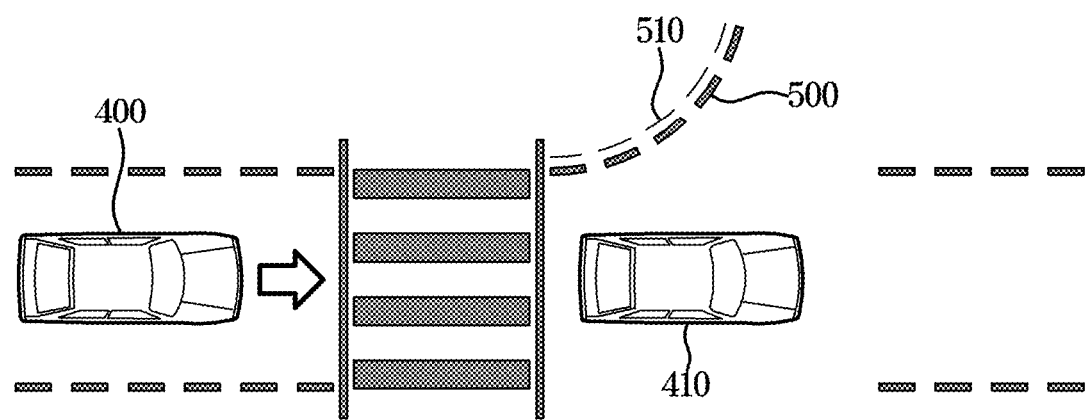
FIG. 5 is a view for explaining a control of a lane misrecognition due to an intersection lane guide line according to an embodiment of the present disclosure.

FIG. 5 is a view for explaining a control of a lane misrecognition due to an intersection lane guide line according to an embodiment of the present disclosure.

Referring to FIG. 5, in a case where there is a lane 510 that is misrecognized due to an intersection lane guide line 500 when the driving vehicle 400 passes through the intersection lane guide line 500, the apparatus 100 for controlling the vehicle by determining a distortion in lane recognition may perform the lateral vehicle control so that the driving vehicle 400 travels using the driving trajectory of the preceding vehicle 410.

Figure 6:
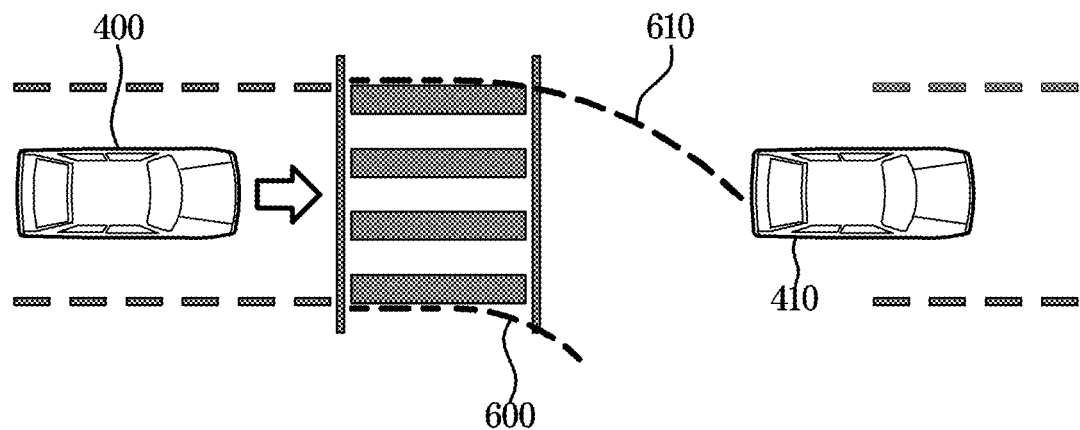
FIG. 6 is a view for explaining a control of a lane misrecognition due to an intersection crosswalk according to an embodiment of the present disclosure.

FIG. 6 is a view for explaining a control of a lane misrecognition due to an intersection crosswalk according to an embodiment of the present disclosure.

Referring to FIG. 6, in a case where there is a lane 610 that is misrecognized due to an lane 600 by an intersection crosswalk when the driving vehicle 400 passes through the lane 600 by the intersection crosswalk, the apparatus 100 for controlling the vehicle by determining a distortion in lane recognition may perform the lateral vehicle control so that the driving vehicle 400 travels using the driving trajectory of the preceding vehicle 410.

Figure 7:
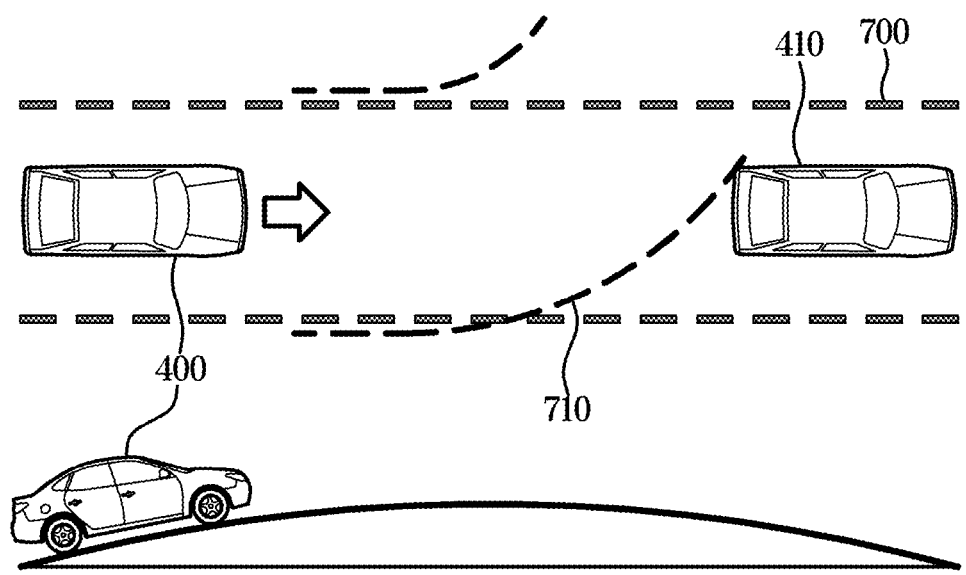
FIG. 7 is a view for explaining a control of a lane misrecognition due to a hill according to an embodiment of the present disclosure.

FIG. 7 is a view for explaining a control of a lane misrecognition due to a hill according to an embodiment of the present disclosure.

Referring to FIG. 7, in a case where there is a lane 710 that is misrecognized due to a curved surface of a hill when the driving vehicle 400 passes through a lane 700 of the hill, the apparatus 100 for controlling the vehicle by determining a distortion in lane recognition may perform the lateral vehicle control so that the driving vehicle 400 travels using the driving trajectory of a preceding vehicle 410.

Figure 8:
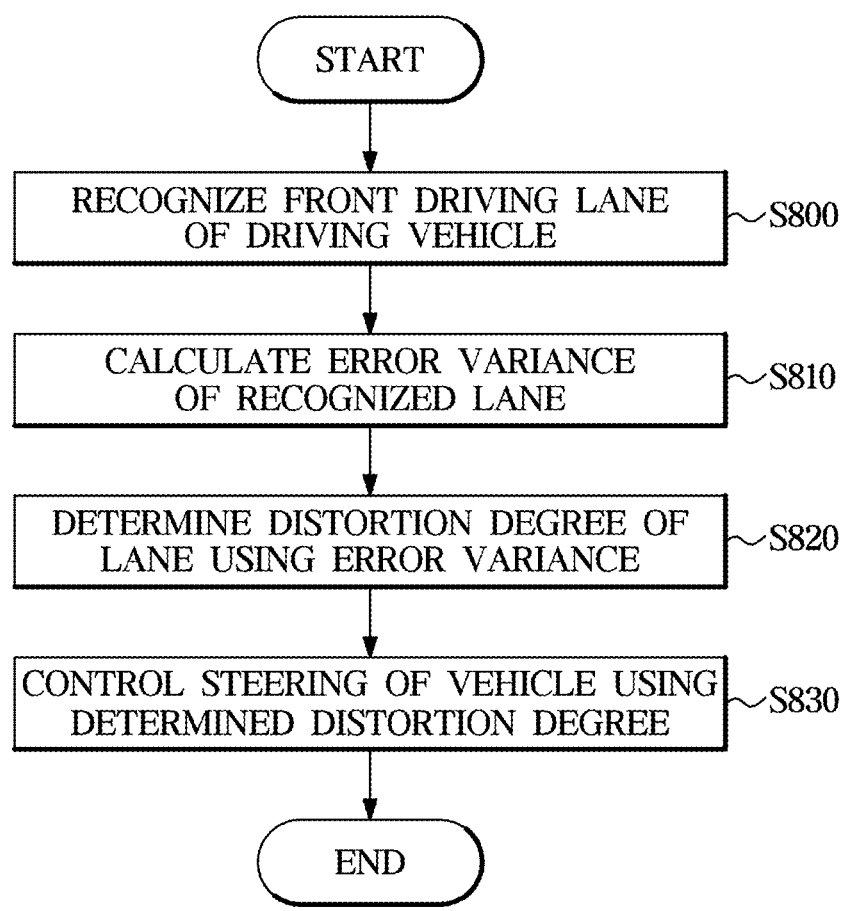
FIG. 8 is a flowchart illustrating a method of controlling the vehicle by determining a distortion in lane recognition according to an embodiment of the present disclosure.

FIG. 8 is a flowchart illustrating a method of controlling the vehicle by determining a distortion in lane recognition according to an embodiment of the present disclosure.

Referring to FIG. 8, the lane recognizer 110 included in the apparatus 100 for controlling the vehicle by determining a distortion in lane recognition may recognize a front driving lane of the driving vehicle [S800].

Referring back to FIG. 8, the error variance calculator 120 included in the apparatus 100 for controlling the vehicle by determining a distortion in lane recognition may calculate an error variance of the recognized lane [S810].

Referring back to FIG. 8, the distortion degree determiner 130 included in the apparatus 100 for controlling the vehicle by determining a distortion in lane recognition may determine a distortion degree of the recognized lane using the error variance [S820].

Referring back to FIG. 8, the vehicle controller 140 included in the apparatus 100 for controlling the vehicle by determining a distortion in lane recognition may control the steering of the vehicle using the determined distortion degree [S830].

Figure 9:
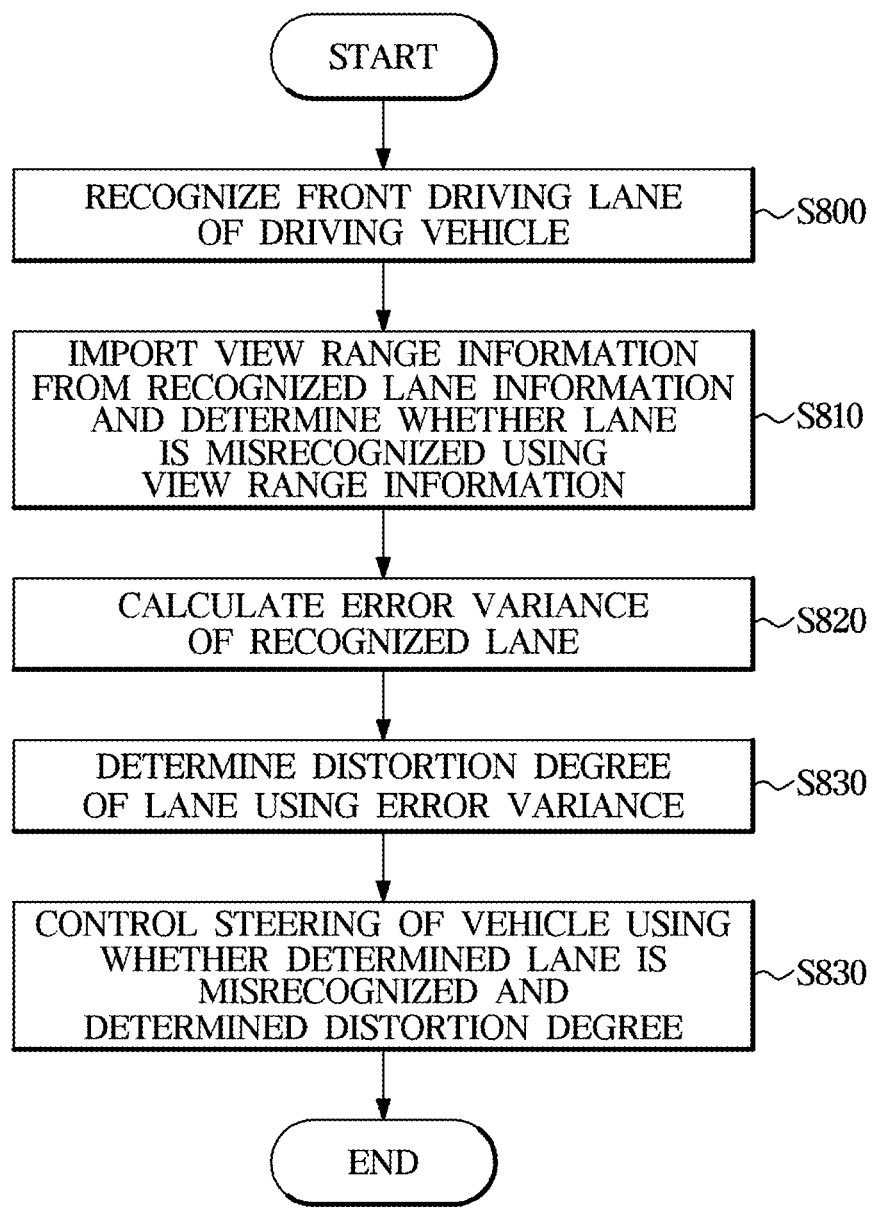
FIG. 9 is a flowchart illustrating a method of controlling a vehicle by determining a distortion in lane recognition according to another embodiment of the present disclosure.

FIG. 9 is a flowchart illustrating a method of controlling a vehicle by determining a distortion in lane recognition according to another embodiment of the present disclosure.

Referring to FIG. 9, the lane recognizer 110 included in the apparatus 100 for controlling the vehicle by determining a distortion in lane recognition may recognize a front driving lane of the driving vehicle [S900].

Referring back to FIG. 9, the lane misrecognition determiner 115 included in the apparatus 100 for controlling the vehicle by determining a distortion in lane recognition may import view range information from the recognized lane information and determine whether the lane is misrecognized using the view range information [S910].

Referring back to FIG. 9, the error variance calculator 120 included in the apparatus 100 for controlling the vehicle by determining a distortion in lane recognition may calculate an error variance from the recognized lane information [S920].

Referring back to FIG. 9, the distortion degree determiner 130 included in the apparatus 100 for controlling the vehicle by determining a distortion in lane recognition may determine a distortion degree of the lane using the error variance [S930].

Referring back to FIG. 9, the vehicle controller 140 included in the apparatus 100 for controlling the vehicle by determining a distortion in lane recognition may control the steering of the vehicle using whether the determined lane is misrecognized and the determined distortion degree [S940].

Figure 10:
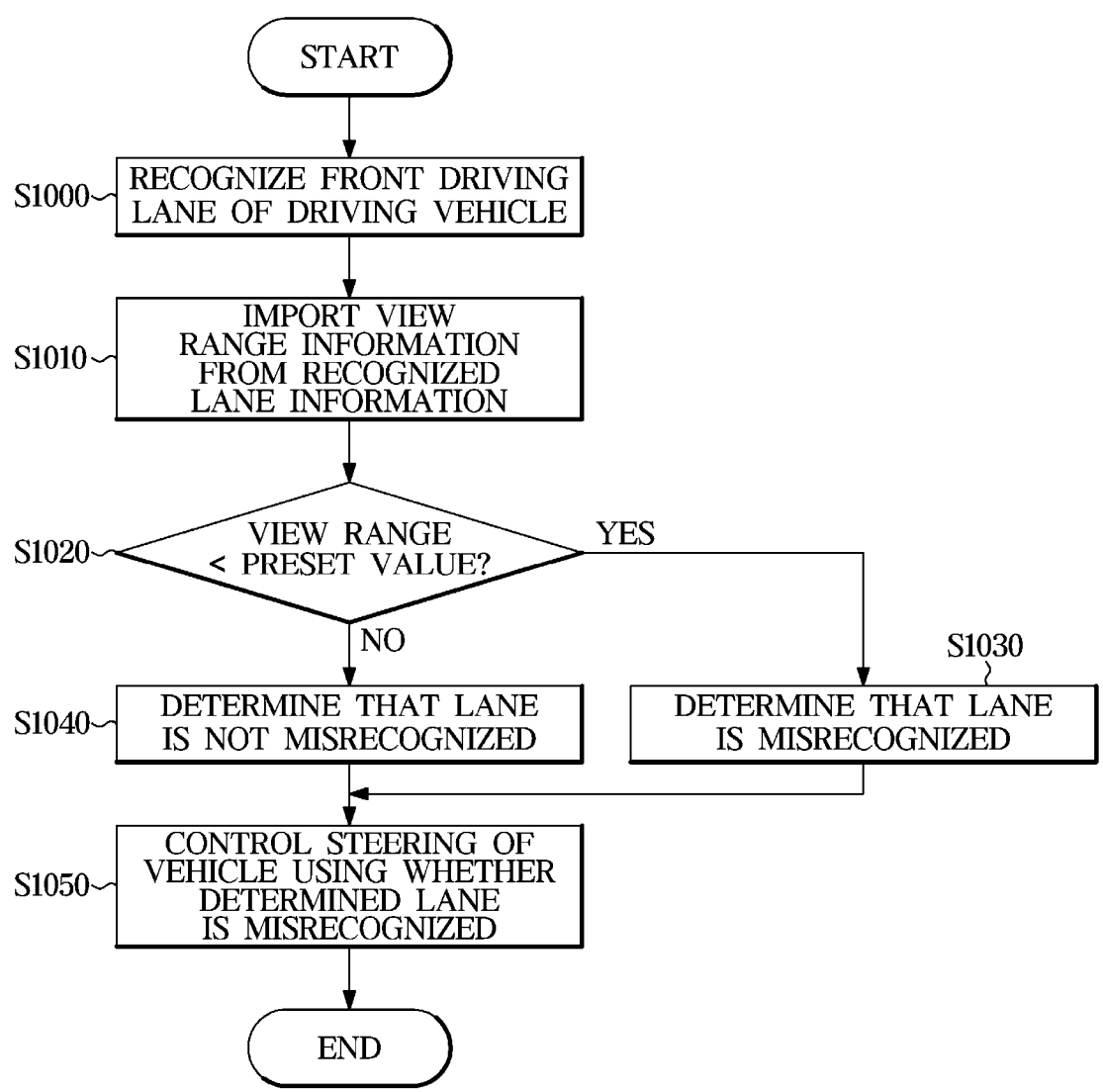
FIG. 10 is a flowchart illustrating a method of controlling a vehicle by determining a distortion in lane recognition according to another embodiment of the present disclosure.

FIG. 10 is a flowchart illustrating a method of controlling a vehicle by determining a distortion in lane recognition according to another embodiment of the present disclosure.

Referring to FIG. 10, the lane recognizer 110 included in the apparatus 100 for controlling the vehicle by determining a distortion in lane recognition may recognize a front driving lane of the driving vehicle [S1000].

Referring back to FIG. 10, the lane misrecognition determiner 115 included in the apparatus 100 for controlling the vehicle by determining a distortion in lane recognition may import view range information from the recognized lane information [S1010].

Referring back to FIG. 10, the lane misrecognition determiner 115 included in the apparatus 100 for controlling the vehicle by determining a distortion in lane recognition may determine whether the view range is less than the preset value [S1020].

Referring back to FIG. 10, the lane misrecognition determiner 115 included in the apparatus 100 for controlling the vehicle by determining a distortion in lane recognition may determine that the lane is misrecognized when the view range is less than the preset value [S1030].

Referring back to FIG. 10, the lane misrecognition determiner 115 included in the apparatus 100 for controlling the vehicle by determining a distortion in lane recognition may determine that the lane is not misrecognized when the view range is not less than the preset value [S1040].

Referring back to FIG. 10, the vehicle controller 140 included in the apparatus 100 for controlling the vehicle by determining a distortion in lane recognition may control the steering of the vehicle using whether the determined lane is misrecognized [S1050].

Figure 11:
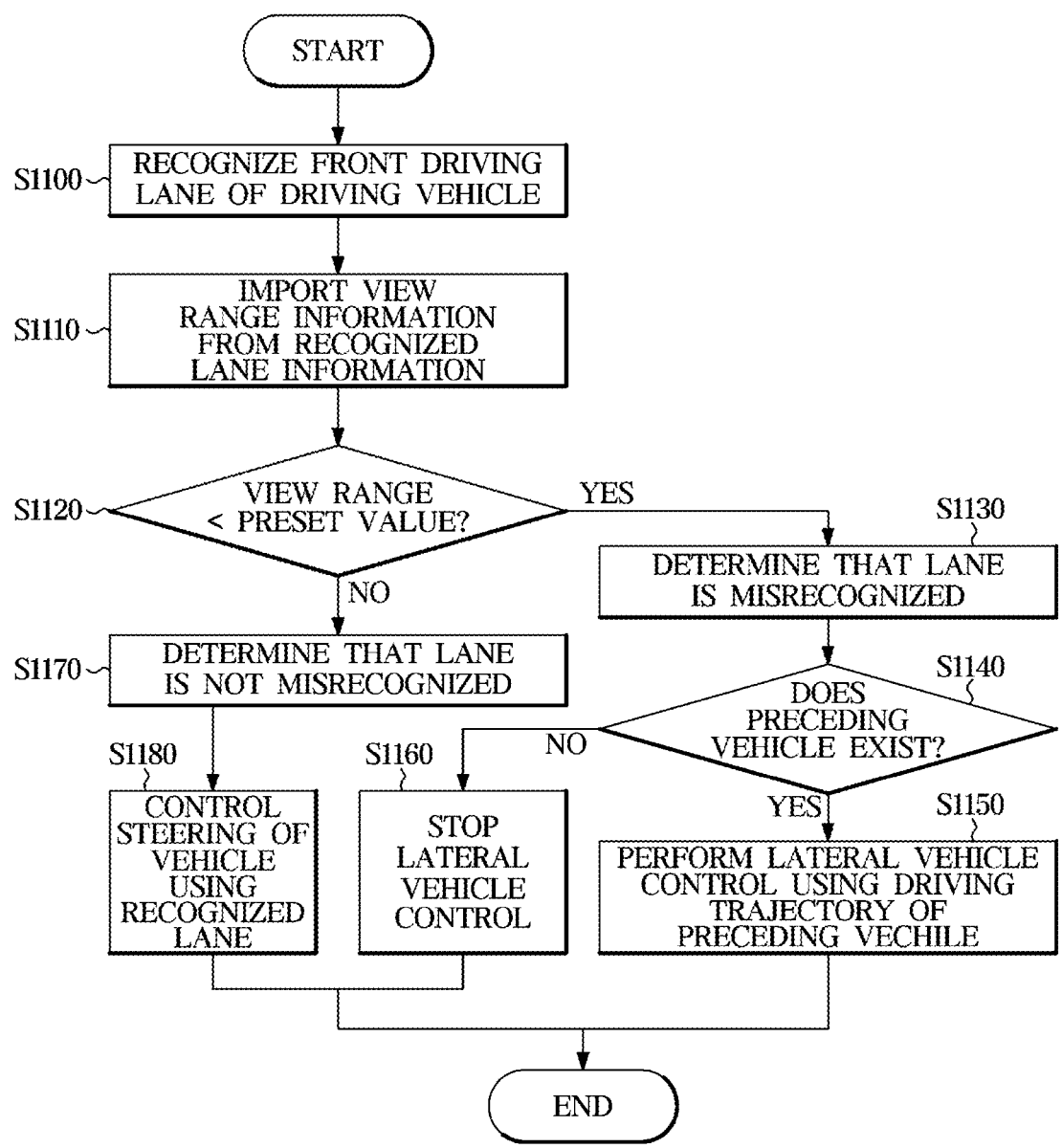
FIG. 11 is a flowchart illustrating a method of controlling a vehicle by determining a distortion in lane recognition according to another embodiment of the present disclosure.

FIG. 11 is a flowchart illustrating a method of controlling the vehicle by determining a distortion in lane recognition according to another embodiment of the present disclosure.

Referring to FIG. 11, the lane recognizer 110 included in the apparatus 100 for controlling the vehicle by determining a distortion in lane recognition may recognize a front driving lane of the driving vehicle [S1100].

Referring back to FIG. 11, the lane misrecognition determiner 115 included in the apparatus 100 for controlling the vehicle by determining a distortion in lane recognition may import view range information from the recognized lane information [S1110].

Referring back to FIG. 11, the lane misrecognition determiner 115 included in the apparatus 100 for controlling the vehicle by determining a distortion in lane recognition may determine whether the view range is less than the preset value [S1120].

Referring back to FIG. 11, the lane misrecognition determiner 115 included in the apparatus 100 for controlling the vehicle by determining a distortion in lane recognition may determine that the lane is misrecognized when the view range is less than the preset value [S1130].

Referring back to FIG. 11, the preceding vehicle existence determiner 135 included in the apparatus 100 for controlling the vehicle by determining a distortion in lane recognition may determine whether a preceding vehicle exists in the front of the vehicle when the lane misrecognition determiner 115 determines that the recognized lane is misrecognized because the view range is less than the preset value [S1140].

Referring back to FIG. 11, the vehicle controller 140 included in the apparatus 100 for controlling the vehicle by determining a distortion in lane recognition may perform lateral vehicle control using the driving trajectory of the preceding vehicle when the preceding vehicle existence determiner 135 determines that the preceding vehicle exists [S1150].

Referring back to FIG. 11, the vehicle controller 140 included in the apparatus 100 for controlling the vehicle by determining a distortion in lane recognition may stop the lateral vehicle control when the preceding vehicle existence determiner 135 determines that the preceding vehicle does not exist [S1160].

Referring back to FIG. 11, the lane misrecognition determiner 115 included in the apparatus 100 for controlling the vehicle by determining a distortion in lane recognition may determine that the lane is not misrecognized when the view range is not less than the preset value [S1170].

Referring back to FIG. 11, the vehicle controller 140 included in the apparatus 100 for controlling the vehicle by determining a distortion in lane recognition may control the steering of the vehicle using the recognized lane when the lane misrecognition determiner 115 determines that the lane is not misrecognized [S1180].

Figure 12:
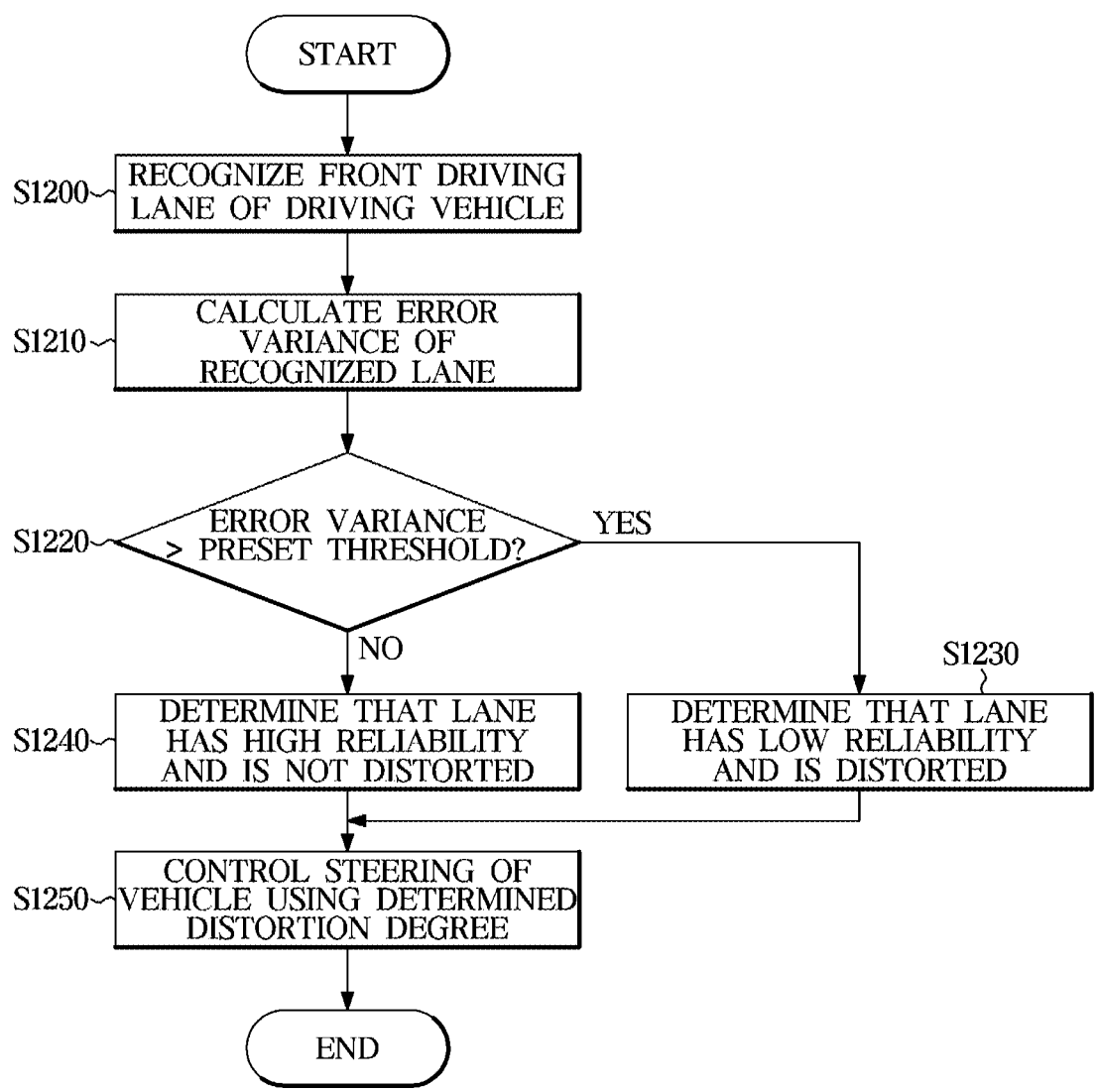
FIG. 12 is a flowchart illustrating a method of controlling a vehicle by determining a distortion in lane recognition according to another embodiment of the present disclosure.

FIG. 12 is a flowchart illustrating a method of controlling a vehicle by determining a distortion in lane recognition according to another embodiment of the present disclosure.

Referring to FIG. 12, the lane recognizer 110 included in the apparatus 100 for controlling the vehicle by determining a distortion in lane recognition may recognize a front driving lane of the driving vehicle [S1200].

Referring back to FIG. 12, the error variance calculator 120 included in the apparatus 100 for controlling the vehicle by determining a distortion in lane recognition may calculate an error variance of the recognized lane [S1210].

Referring back to FIG. 12, the distortion degree determiner 130 included in the apparatus 100 for controlling the vehicle by determining a distortion in lane recognition may determine whether the error variance exceeds the preset threshold [S1220].

Referring back to FIG. 12, the distortion degree determiner 130 included in the apparatus 100 for controlling the vehicle by determining a distortion in lane recognition may determine that the lane has a low reliability and is distorted when the error variance exceeds the preset threshold [S1230].

Referring back to FIG. 12, the distortion degree determiner 130 included in the apparatus 100 for controlling the vehicle by determining a distortion in lane recognition may determine that the lane has a high reliability and is not distorted when the error variance does not exceed the preset threshold [S1240].

Referring back to FIG. 12, the vehicle controller 140 included in the apparatus 100 for controlling the vehicle by determining a distortion in lane recognition may control the steering of the vehicle using the determined distortion degree [S1250].

The present disclosure described above may be embodied as computer-readable codes on a medium in which a program is recorded. The computer-readable medium includes all kinds of recording devices in which data that may be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like, and also include those implemented in the form of a carrier wave (for example, transmission over the Internet). In addition, the computer may include the vehicle controller 140 of the present disclosure.

As is apparent from the above, according to the present disclosure, an apparatus and a method for determining whether there is a distortion in lane recognition and adaptively adjusting a steering control amount according to lane information can be provided.

Further, according to the present disclosure, an apparatus and a method for importing view range information from the recognized lane information and controlling the steering of the vehicle by determining whether the lane is misrecognized using the view range information as well as for determining whether there is a distortion in lane recognition according to lane information can be provided.

The description above and the accompanying drawings are merely illustrative of the technical spirit of the present disclosure, and a person of ordinary skill in the art to which the present disclosure pertains will be able to make various modifications and variations such as combining, separating, substituting and changing the configurations without departing from the essential characteristics of the present disclosure. Accordingly, the disclosed embodiments are not intended to limit the technical spirit of the present disclosure but to describe the scope of the technical spirit of the present disclosure. That is, within the scope of the present disclosure, all of the components may be operated in a selective combination with one or more. The protection scope of the present disclosure should be interpreted by the following claims, and all technical ideas within the scope equivalent thereto shall be construed as being included in the scope of the present disclosure.

What is claimed is:

1. An apparatus for controlling a vehicle by determining a distortion in lane recognition, the apparatus comprising:
a lane recognizer including an image sensor disposed in the vehicle to have a view of the outside of the vehicle and configured to capture image data and a processor configured to process the image data captured by the image sensor, and recognizing a front driving lane of the driving vehicle; and
a controller configured to control the vehicle by determining a lane distortion in lane recognition based at least in part on the processing of the image data,
wherein the controller includes an error variance calculator for calculating an error variance of the recognized lane, a lane distortion determiner for determining an amount of distortion of the recognized lane using the error variance, and a vehicle controller for determining one among a plurality of operations to control steering of the vehicle based on the determined lane distortion,
the controller further includes a preceding vehicle existence determiner for determining whether a preceding vehicle exists when the lane distortion determiner determines that the recognized lane has a low reliability and is distorted, and
when the lane distortion determiner determines that the recognized lane has the low reliability and is distorted and when the preceding vehicle existence determiner determines that the preceding vehicle exists, the vehicle controller performs lateral vehicle control based on a driving trajectory of the preceding vehicle.

2. The apparatus according to claim 1, wherein
the lane distortion determiner determines that the recognized lane has the lower reliability and is distorted when the error variance is greater than a preset threshold.

3. The apparatus according to claim 1, wherein
the lane distortion determiner determines that the recognized lane has a high reliability and is not distorted when the error variance is less than or equal to a preset threshold.

4. The apparatus according to claim 1, wherein
when the preceding vehicle existence determiner determines that the preceding vehicle does not exist, the vehicle controller stops the lateral vehicle control.

5. The apparatus according to claim 1, wherein
the lane recognized by the lane recognizer is an intersection zigzag lane, and
the error variance calculator calculates an error variance of the recognized intersection zigzag lane.

6. The apparatus according to claim 1, wherein
the lane recognized by the lane recognizer is a lane due to an intersection crosswalk, and
the error variance calculator calculates an error variance of the recognized lane due to the intersection crosswalk.

7. The apparatus according to claim 1, wherein
the lane recognized by the lane recognizer is a lane due to an intersection lane guide line, and
the error variance calculator calculates an error variance of the recognized lane due to the intersection lane guide line.

8. The apparatus according to claim 1, wherein
the lane recognized by the lane recognizer is a toll gate lane, and
the error variance calculator calculates an error variance of the recognized toll gate lane.

9. An apparatus for controlling a vehicle by determining a distortion in lane recognition, the apparatus comprising:
a lane recognizer including an image sensor disposed in the vehicle to have a view of the outside of the vehicle and configured to capture image data; and
a domain control unit configured to recognize a front driving lane of the vehicle by processing image data captured by the image sensor and to control at least one driver assistance system provided in the vehicle,
wherein the domain control unit, based at least in part on the processing of the image data, calculates an error variance of the recognized lane, determines an amount of distortion of the recognized lane using the error variance, and determines one among a plurality of operations to control steering of the vehicle based on the determined lane distortion,
the domain control unit determines whether a preceding vehicle exists when it is determined that the recognized lane has a low reliability and is distorted, and
when it is determined that the recognized lane has the low reliability and is distorted and when it is determined that the preceding vehicle exists, the domain control unit performs lateral vehicle control based on a driving trajectory of the preceding vehicle.

10. The apparatus according to claim 9, wherein
the domain control unit determines that the recognized lane has the lower reliability and is distorted when the error variance is greater than a preset threshold.

11. The apparatus according to claim 9, wherein
the domain control unit determines that the recognized lane has a high reliability and is not distorted when the error variance is less than or equal to a preset threshold.

12. The apparatus according to claim 9, wherein
the domain control unit determines that a preceding vehicle exists when it is determined that the recognized lane has the lower reliability and is distorted.

13. The apparatus according to claim 12, wherein
when it is determined that the preceding vehicle exists, the domain control unit performs lateral vehicle control using the driving trajectory of the preceding vehicle, and
when it is determined that the preceding vehicle does not exist, the domain control unit stops the lateral vehicle control.

14. The apparatus according to claim 9, wherein
when the recognized lane is an intersection zigzag lane, the domain control unit calculates an error variance of the recognized intersection zigzag lane.

15. An image sensor disposed in a vehicle to have a view of the outside of the vehicle and configured to capture image data, wherein:
the image data is, by being processed by a processor, used to recognize a front driving lane of the vehicle, calculate an error variance of the recognized lane, and determine a lane distortion of the recognized lane using the error variance, and
the determined lane distortion is used to control the steering of the vehicle.

16. A method for controlling a vehicle by determining a distortion in lane recognition, the method comprising:
recognizing a front driving lane of the vehicle;
calculating an error variance of the recognized lane;
determining an amount of distortion of the recognized lane using the error variance;
determining one among a plurality of operations to control steering of the vehicle based on the determined lane distortion;
when it is determined that the recognized lane has the low reliability and is distorted and when it is determined that the preceding vehicle exists, performing lateral vehicle control based on a driving trajectory of the preceding vehicle.

17. An apparatus for controlling a vehicle by determining a distortion in lane recognition, the apparatus comprising:
a lane recognizer including an image sensor disposed in the vehicle to have a view of the outside of the vehicle and configured to capture image data and a processor configured to process the image data captured by the image sensor, and recognizing a front driving lane of the driving vehicle; and
a controller configured to control the vehicle by determining a distortion in lane recognition based at least in part on the processing of the image data,
wherein the controller includes a lane misrecognition determiner for importing view range information from the recognized lane information and determining whether the lane is misrecognized using the view range information, an error variance calculator for calculating an error variance from the recognized lane information, a lane distortion determiner for determining the lane distortion of the lane using the error variance, and a vehicle controller for determining one among a plurality of operations to control steering of the vehicle based on whether the determined lane is misrecognized and the determined lane distortion,
the controller further includes a preceding vehicle existence determiner for determining whether a preceding vehicle exists in the front of the vehicle when the lane misrecognition determiner determines that the view range is less than a preset value and the recognized lane is misrecognized, and
when the preceding vehicle existence determiner determines that the preceding vehicle exists and when the lane misrecognition determiner determines that the view range is less than a preset value and the recognized lane is misrecognized, the vehicle controller performs lateral vehicle control based on a driving trajectory of the preceding vehicle.

18. The apparatus according to claim 17, wherein
when the preceding vehicle existence determiner determines that the preceding vehicle does not exist, the vehicle controller stops the lateral vehicle control.

* * * * *